United States Patent [19]

Girgis

[11] 4,164,485

[45] Aug. 14, 1979

[54] GLASS FIBER COATING COMPOSITION FOR GLASS FIBER FILAMENT BUNDLES TO PRODUCE REINFORCING MEMBERS FOR ELASTOMERIC ARTICLES

[75] Inventor: Mikhail M. Girgis, Pittsburgh, Pa.

[73] Assignee: PPG Industries, Inc., Pittsburgh, Pa.

[21] Appl. No.: 876,588

[22] Filed: Feb. 10, 1978

Related U.S. Application Data

[60] Continuation of Ser. No. 762,538, Jan. 26, 1977, abandoned, which is a division of Ser. No. 604,367, Aug. 13, 1975, which is a continuation-in-part of Ser. No. 535,389, Dec. 23, 1974, abandoned.

[51] Int. Cl.$^2$ .................. C08L 7/02; C08L 25/10; C08L 61/12
[52] U.S. Cl. .................. 260/5; 260/4 AR; 260/4 R; 260/28.5 B; 260/29.3; 260/29.7 NR; 260/38; 428/375; 428/378
[58] Field of Search ......... 260/29.3, 29.7 NR, 28.5 B, 260/28.5 A, 5 B, 4 R; 428/378

[56] References Cited

U.S. PATENT DOCUMENTS

| 2,287,700 | 6/1942 | Muskat | 106/306 |
|---|---|---|---|
| 2,888,377 | 5/1959 | Allen | 106/306 |
| 3,194,294 | 7/1965 | Van Gils | 260/29.3 |
| 3,424,608 | 1/1969 | Marzocchi et al. | 260/29.3 |
| 3,533,830 | 10/1970 | Marzocchi et al. | 260/29.3 |
| 3,591,357 | 7/1971 | Janetos | 65/3 C |
| 3,718,449 | 2/1973 | Fahey | 65/3 C |
| 3,740,257 | 6/1973 | Roscher | 427/379 |
| 3,773,546 | 11/1973 | Marzocchi | 65/3 C |
| 3,796,627 | 3/1974 | Marzocchi | 428/389 |
| 3,817,775 | 6/1974 | Coakley | 428/392 |

Primary Examiner—Theodore E. Pertilla
Attorney, Agent, or Firm—Kenneth J. Stachel; John E. Curley

[57] ABSTRACT

Glass fiber filament bundles such as cords for rubber reinforcement are impregnated and coated with a coating composition comprised of, in parts by weight on a dry solids basis:

| 10-50 | neoprene latex |
|---|---|
| 50-90 | styrene-butadiene vinylpyridine latex |
| 4-20 | resorcinol formaldehyde resin |
| 2-6 | resorcinol |
| 1-3 | formaldehyde |
| up to 25 | wax |
| up to 25 | natural rubber |

Glass fiber cord, produced from strands and filaments, in accordance with the invention, provides an improved reinforcing member for elastomeric articles such as tires and particularly for radial tires. A method of coating the glass fibers and forming the cord from the individual filaments and strands is also disclosed.

8 Claims, No Drawings

GLASS FIBER COATING COMPOSITION FOR GLASS FIBER FILAMENT BUNDLES TO PRODUCE REINFORCING MEMBERS FOR ELASTOMERIC ARTICLES

REFERENCE TO CROSS-RELATED APPLICATIONS

This application is a continuation of application Ser. No. 762,538, filed Jan. 26, 1977, now abandoned which is a division of application Ser. No. 604,367, filed Aug. 13, 1975, which is a continuation-in-part of application Ser. No. 535,389, filed Dec. 23, 1974, now abandoned.

BACKGROUND OF THE INVENTION

This invention relates to coated glass fiber bundles suitable for rubber reinforcement.

It has been long recognized that glass fiber material makes an ideal reinforcement for rubber products, such as automobile tires and the like. In preparing glass fiber material for such applications, the individual glass fibers and groups of glass fibers in the form of strand, rope, cord, roving, fabric and the like, are coated with a rubber adhesive to aid in bonding the glass to the elastomeric materials to be reinforced. The rubber adhesive generally comprises a resin and an elastomeric material to link between the glass and the main body of material being reinforced.

Generally, in the production of fiber glass reinforcing cords or other bundle forms, individual fibers are coated with a size and then are brought together in bundle form. The bundle is coated by dipping or otherwise contacting with a coating mixture containing an elastomeric latex and a homogeneous resin component. Commonly, the sizing contains a coupling agent, such as a silane or Werner complex, a lubricant, and other ingredients to assist in handling the cord during processing.

Glass fibers are excellent reinforcing materials and are distinguishable from other fibrous reinforcing materials such as natural and synthetic organic fibers, in that glass fibers do not become elongated or deformed under stress to the extent of other fibers. Unlike other fibers, particular combinations of glass fibers with encapsulating coatings cooperate to yield reinforced materials that have greater strength than either the glass or the coating material alone. While fibrous materials, other than glass, which are subject to substantial stress elongation, are essentially limited in tensile strength to the basic strength of the bare fibers, even if coated, properly coated glass fibers have greater strength than the glass alone. For example, the low modulus elasticity of glass may be exploited to provide reinforced tires having superior road performance if an appropriate coating medium is provided to transfer stresses to all fibers in the glass fiber cord so that loading throughout is substantially uniform. This phenomenon is illustrated by the observation that a typical uncoated fiber glass cord (G75, 5/0, filament count 2,000 i.e., 2,000 filaments of G fibers of about 9.14$\mu$ meters diameter, 15,120 meters/kg., five strands per cord) has a tensile strength of about 35 to 40 pounds (156 to 178 newtons) ASTM test G 578-52 but when coated with the resorcinol formaldehyde latex coating, such a cord has a tensile strength of about 50 to 70 pounds (222 to 311 newtons).

The above mentioned coated glass fiber cord, the G-75, 5/0 has found particular utility in the reinforcement of power transmission belts and fiber glass reinforced tires and the like. However, to date, glass fiber tire cord has found its main utility in bias belted tires. It is the desire of the pneumatic tire industry to produce radial tires reinforced with glass fibers which would have extended mileage, improved handling, and the like properties over the bias belted tires. However, the typical glass fiber tire cord, G-75, 5/0 shows some deficiency in use with radial ply tires.

In a radial tire, just as in bias ply tires, the carcass is reinforced with a reinforcing cord such as nylon, rayon, steel, glass or the like. However, in radial tires, as opposed to bias belted tires, the amount of cord necessary for reinforcement is much greater. Because of this, it is necessary to incorporate more individual filaments per unit area in the carcass and belt in order to incorporate more individual filaments per unit area, i.e., the packing of the cord must be greater. it has been found that in order to facilitate in maintaining the necessary packing, a thicker cord is required, and cords having from 10 to 15 strands therein have been found to have utility for this purpose. However, this cord, with more strands therein, produces an effect known as blow holes. A blow hole is caused when cord is cured within the rubber matrix and the individual strands which comprise the cord have greater adhesion to the rubber matrix than cohesion to themselves. Therefore, the strands separate and pull apart, thus inducing an air space between the individual strands in the cord. This blow hole phenomenon detracts from the desirable properties which are imparted by radial ply tires. Therefore, there is a need for an improved coating composition to reduce or completely obviate this blow hole phenomenon.

In accordance with the invention, a glass fiber coating composition is provided, which when coated on fiber strand which is subsequently plied into cords and incorporated into an elastomeric matrix, which substantially reduces or completely obviates this blow hole phenomenon.

SUMMARY OF THE INVENTION

A glass fiber bundle is provided which has been coated with an aqueous composition comprising a neoprene latex, a styrene-butadiene-vinyl pyridine latex, resorcinol formaldehyde resin, resorcinol, formaldehyde. The solids content of the composition is about 20 to 40 percent in order to impart a coating weight on the glass of about 15 to 40 percent based on the weight of bare glass. This coating composition is coated on sized glass fiber strand which is subsequently gathered in parallel and twisted into cord.

The Neoprene latex constituent of the coating composition is produced from the emulsion polymerization of chloroprene by methods widely known and more fully taught in "Neoprene Latex", John C. Carl, E. I. duPont de Nemours & Co., 1962. In order for the Neoprene latex to be properly incorporated into the coating composition the emulsifying agent must be anionic in nature. Typically, emulsifying agents such as sodium rosinate and the potassium salt of disproportionated rosin are used as emulsifiers in the Neoprene latex useful in the practice of the invention. The solids content of the Neoprene latex ranges from 34 percent to about 60 percent and preferably 50 to 60 percent. DuPont Neoprene latices No. 750,571 and 670 have found particular utility and are all anionically emulsified. Ten to fifty parts by weight of Neoprene on a dry solids basis in the coating composition has found utility for reducing the blow hole phenomenon in cord formulations containing 100 parts of total elastomer. A particularly useful range of 25 to 30 parts by weight on a dry solids basis of Neoprene is believed to be the optimum level of the Neoprene polymer in the coating composition.

The other elastomer in the two component elastomer system of the invention is a styrene-butadiene-vinylpyridine latex. The ratio of styrene to butadiene is typically about 50:50 which accounts for about 89 to 95 percent on a mole basis, of the monomeric components of the polymer. The other 5 to 11 percent is vinylpyridine monomer. The vinylpyridine constituent of the polymer is considered to impart the desirable characteristic of adhesion to the glass and therefore, when less than 5 percent of the monomer in the polymer is vinylpyridine, adhesion is substantially reduced. However, 11 percent vinylpyridine in the polymer appears to give proportional benefits commensurate with cost since the vinylpyridine portion of the polymer constitutes the major contribution to the cost thereof.

Styrene-butadiene-vinylpyridine latex is usually 35 to 50 percent by weight solids, and more preferably and more commonly 40 percent solids. On a dry solids basis, based on 100 parts of solid rubber in a coating formulation, 50 to 90 parts should be constituted of the styrene-butadiene-vinylpyridine latex and more preferably about 70 to 80 parts on a dry solids basis.

A natural rubber latex may be added in quantities up to 25 parts by weight solids to increase the tackiness of the cord to promote adhesion between the coated cord and rubber stock during processing. Also the natural rubber enhances the heat aging characteristics of the cord.

The resorcinol formaldehyde resin incorporated into the composition is usually one having a formaldehyde level to resorcinol of 0.4 to 0.8 formaldehyde to 1 resorcinol on a mole basis. Such a resin is characterized by a low degree of polymerization and minimum molecular weight. It has been found that a particularly useful resorcinol formaldehyde resin has a ratio of 0.6 formaldehyde to 1 resorcinol, and is sold under the designation Penacolite ® R-2200. In order to increase the molecular weight of the resorcinol formaldehyde resin on the final coated cord, additional resorcinol and formaldehyde in the form of formalin may be added to the coating composition. Typically, the resorcinol formaldehyde resin is incorporated into the coating composition at a level of 4 to 20 parts by weight, the resorcinol at 2 to 6 parts by weight and formaldehyde at 1 to 3 parts by weight all on a dry solids basis based on 100 parts of total elastomer solids. Particularly useful levels have been found to be 11 parts by weight resorcinol formaldehyde resin, 4 parts by weight of resorcinol and 1.7 parts of formaldehyde, all ingredients on a dry solids basis. These resorcinol and formaldehyde components impart adhesive characteristics to the coating composition aiding in bonding the sized glass fibers to the elastomeric latex in which the fibers are incorporated. If too low a level of resorcinol formaldehyde components is incorporated into the coating composition, the strand will have low adhesion to the rubber matrix. It too high a level of the resorcinol formaldehyde components is utilized, the cord will have low integrity, i.e., the individual strands will separate from the cord. Also the cord stiffens causing handling problems, and brittleness. Thus, the level of resorcinol formaldehyde in the coating composition recited herein provides good integrity and texture to the coated cord while maintaining adhesion of the glass to the elastomeric matrix.

A wax may be utilized in the coating composition to protect the elastomer in the coating composition from attack by ultraviolet light. Preferably, up to 25 parts by weight on a dry solids basis based on 100 parts of elastomer solids is incorporated into the coating composition. Greater than 25 parts of wax affects adhesion of the coating composition to the resin matrix. Another advantage of the wax constituent is that it prevents tackiness of the cord and improves runability. The preferred amount of wax is up to 5 parts by weight to obtain the maximum benefits. These waxes generally have a melting point of higher than about 50° C. for the paraffin waxes and microcrystalline waxes. The preferred melting point for the microcrystalline waxes is above about 100° C. or more preferably about 135° C. When paraffin wax is employed in the coating composition, their melting point should generally vary between 50° C. to about 80° C.

Zinc oxide, magnesium oxide, litharge, or red lead are incorporated into the coating composition to promote cross-linking or curing of the Neoprene and improve resistance of the composition to aging, heat and light, and also act as acid acceptors to accept the HCl generated by the cross-linking of the Neoprene. Up to three parts by weight of one of these materials or a combination thereof has been found to be useful. Zinc oxide has particular utility in the coating composition. Because the level of the zinc oxide or other acid acceptor is contingent on the level of Neoprene in the coating composition about up to 1 part by weight of zinc oxide to 10 parts by weight of Neoprene is a desired ratio to provide optimum properties to the cured coating composition. Thus, in a formulation having 50 parts Neoprene, up to 5 parts zinc oxide is a preferred range. Typically, when 25 parts Neoprene is used, up to 1.2 parts of zinc oxide is used.

In order to improve the heat resistance of the cord, especially when the cord is to be incorporated into tires, thus encountering heat on running, up to about 1.5 parts of hexamethylene tetraamine can be used in the coating composition, and more preferably 0.75 parts. The hexamethylene tetraamine in addition to improving the heat aging, improves the adhesion of the cord to the elastomeric matrix.

Treated diatomaceous earth may be incorporated into the composition to provide heat tensile aging characteristics. Thus, when a coated glass fiber cord is aged one week at 120° F. at 90 percent humidity, coated cord usually loses about 20-40 percent of its tensile strength. The addition of the treated diatomaceous earth retards such tensile degradation.

The chemical diatomaceous earths are those hydrothermally reacted with lime or magnesium oxide. Typically, these materials are characterized as hydrocalcium silicates and hydromagnesium silicates. Materials such as Microcell ® and Celikate ®, sold by Johns-Mansville Company are useful diatomaceous—earths so long as they contain a calcium oxide level in the range of 22-28 percent and a magnesium oxide level of about 16 percent.

Other ingredients known to those skilled in the art may be added to the coating composition to impart varying characteristics thereto. However, the materials previously recited have been found particular utility in an improved coating composition for use in fiber coated cord to be incorporated into elastomeric matrices.

The term "elastomer" as used herein means and includes both synthetic and natural rubber. "Natural rubber" as used herein is the elastic solid obtained from the sap or latex of the Havea tree, the major constituent being the homopolymer of 2-methyl 1,3-butadiene (isoprene). By "synthetic rubber" as used herein is meant to encompass polymers based upon at least 2 percent of a conjugated unsaturated monomer, said conjugation being in a 1-3 position in the monomer chain and the final polymer in its uncured state has an extensibility of at least 200 percent and a memory of at least 90 percent, when stretched within its extensibility limits and released instantaneously. The unsaturated monomers which are used in the preparation of synthetic rubber are but not limited to chloroprene, butadiene, isoprene, cyclopentadiene, dicyclopentadiene and the like. Other monomers capable of free radical, anionic, or cationic polymerization may be incorporated into the polymer chain along with the conjugated unsaturated monomers to form useful synthetic rubbers. These olefins are typically monoethylenically unsaturated monomers. Monoethylenically unsaturated monomers as used herein are characterized by the $CH_2=C<$ group.

These monoethylenically unsaturated monomers are but not limited to the acrylic monomers such as methacrylic acid, acrylic acid, acrylonitrile, methacrylonitrile, methyl acrylate, methylmethacrylate, ethyl acrylate, ethyl methacrylate, and the like. Monoolefinic hydrocarbons such as ethylene, butylene, propylene, styrene, alpha-methylstyrene and the like and other functional monounsaturated monomers such as vinyl pyridine, vinyl pyrillidone and the like monomers.

In the method of producing the glass fiber cord of the invention, glass fibers are sized with a conventional glass fiber sizing composition. Preferably included in the sizing composition is a dual-functional coupling agent such as a silicon containing organic compound or a Werner complex which establishes a bond with the glass through the metal atom and a bond with the rubber through the organic radicals attached to the metal atom.

Typically, useful reactants in the form of silane coupling agents are but not limited to gamma-aminopropyltriethoxy silane, beta-hydroxyethyl gamma-aminopropyltriethoxy silane and beta-aminoethyl gamma-aminopropyltriethoxy silane, $(CH_3O)_3$, $Si(CH_2)_3$, $NH(CH_2)_2$, $COOCH_3$, gamma-glycidoxypropyltrimethoxy silane, vinyl triacetoxy silane, gamma-metacryloxy propyltrimethoxy silane, vinyl triethoxy silane, vinyl(beta-methoxy ethoxy) silane, beta-(3,4-epoxy cyclohexyl) ethyl trimethoxy silane and the like. Typical of the sizes which may be applied to the glass fibers which are subsequently to be coated and processed into cord are the sizes disclosed in U.S. Pat. Nos. 3,437,517, 3,459,585 and 3,887,389 incorporated by reference herein.

Generally, in the method of forming glass fiber cord in accordance with the invention, the glass fibers are formed at a fiber-forming bushing, sized with an aqueous sizing composition (hereinbefore discussed) gathered into strand and wound on a forming package. This process is more fully described in the aforementioned patents. The forming packages are then dried and mounted on a creel, unwound and coated with the coating composition of the invention.

A preferred method of producing the coated glass fiber bundles of this invention is to contact a continuous bundle, for example, strand which has been previously sized with the coating composition of the invention, dry the coating within the bundle, and then cure the coating residing within and about the bundle to produce a coated cord suitable for rubber reinforcement. A particularly advantageous method for producing the glass fiber bundles of the invention is based upon the method described in U.S. Pat. No. 3,619,252 "Manufacturer of Elastomer Coated Glass Fibers" by Alfred M. Roscher, which is incorporated herein by reference. This invention is particularly applicable to glass fiber, filament bundles, having complete filament encapsulation and having a relatively high ratio of coating weight (i.e., about 15-40 percent) to glass weight.

A plurality of glass fiber strand, each which have been previously sized, are combined in parallel relation and passed through a guide in tangential contact across motor driven rollers. The rollers are partially immersed in an aqueous rubber dipper emulsion and these rollers pick up the coating material when rotated. The coating which is picked up is brought into contact with the glass fiber strands, coating and impregnating the combined bundle of strands. Relaxation of the tension in the combined bundle of strands opens the spacing between the fibers and between strands enhancing impregnation of the coating into the bundle. Typically, the coating composition solids of the aqueous dip will be about 20-40 percent, depending upon the total amount of coating composition solids to be imparted into the glass fiber cord. Lower solids levels will produce cord with low coating add on based on the weight of the glass, and a higher solids content will produce a coated glass fiber cord having a high amount of coating composition solids based on the weight of the glass. Thus, coating add on weight is about 15-40 percent based on the weight of the glass fibers, more preferably 20-30 percent to provide a coated glass fiber bundle or cord which is useful for the reinforcement of elastomeric matrices.

After contacting the fiber glass bundle with the coating composition for sufficient time to fully impregnate the bundle with water and solids-containing dip, the bundle is passed through a dielectric heater or drying oven. The drying oven is so designed and operated that water is removed rapidly from the inside of the bundle as well as from the surface of the bundle without substantial migration of the solids from the interior of the surface of the bundle and without excessive blistering.

The dried glass fiber bundle is then subjected to heat to partially cure the rubber adhesive coatings throughout the bundle. It is preferably to partially cure the coating while completing the curing of the coating on the glass fiber when it is embedded in the rubber matrix being reinforced during the curing of the rubber in the final article.

A second method for making the glass fiber bundles of the invention is based upon the method described in U.S. Pat. No. 3,718,448 entitled "Fiber Forming and Coating Process" by Warren W. Drummond and Donald W. Denniston which is assigned to the present assignee and is incorporated herein by reference and made a part hereof. Upon forming individual glass fibers which are drawn over a roller coater, such as described in U.S. Pat. No. 2,873,718, the coating composition having a silane coupling agent previously disclosed herein, is applied to the fibers passing over the roller. The coated fibers are brought together into strand and are dried. Drying is accomplished by passing the strands through a dielectric oven, hot gas or convection oven, or an infrared radiant heating chamber. The strands of glass fibers are brought together into cords or rovings and are further heated to partially cure the coating composition and bond the strands together into a bundle. Following this, if additional elastomer coating is desired, the composite glass fiber bundle may be futher coated or impregnated with additional coating.

DESCRIPTION OF PREFERRED EMBODIMENTS

A coating mixture is prepared having the following composition based on 100 parts by weight solids of combined Neoprene rubber and styrene-butadiene-vinylpyridine rubber.

| Ingredients | Range Parts by Weight Non-Aqueous | Preferred Composition Parts By Weight |
|---|---|---|
| Styrene-butadiene-vinylpyridine latex 40 to 60 percent solids | 50–90 | 75 |
| Neoprene latex 34 to 60 percent weight solids | 10–50 | 25 |
| Natural Rubber latex 45 to 65 percent solids | Up to 25 | 10 |
| Resorcinol formaldehyde resin | 4–20 | 11 |
| NH$_4$OH (28 percent in water) | 0.14–.56(aqueous) | 0.14(aqueous) |
| Formaldehyde (37 percent in water) | 1–3 | 1.67 |
| Resorcinol | 2–6 | 4.0 |
| Zinc oxide (50 percent in water) | Up to 5 | 0.6 |
| Wax | Up to 25 | 5 |
| Hexamethylene tetraamine | Up to 1.5 | .75 |
| Treated diatomaceous earth | 0.5–5 | .75 |

Water sufficient to produce a mixture having 20 to 40 percent by weight solids, preferably 25 to 35 percent solids.

The mixture is prepared by adding about 70 to 75 percent of the total water at about 22° to 25° C. to a premix tank. The ammonium hydroxide is added to the water with agitation. The resorcinol is added to the premix tank also with agitation. The resorcinol formaldehyde resin is added to the premix tank with agitation. The agitation is continued for 15 minutes after the addition is complete and the mixture is allowed to stand for about 45 minutes thereafter. To a main mix tank is added the styrene-butadiene-vinylpyridine latex, Neoprene latex and the natural rubber latex if utilized, with agitation. The resorcinol formaldehyde, resin, ammonium hydroxide, and resorcinol premix is added to the combined latices in the main mix tank. Care must be taken that the resorcinol formaldehyde resin, ammonia and resorcinol premix has a pH of 7.5 or above to avoid coagulation of the latices. To a small premix tank is charged the hexamethylene tetraamine and about 8 to 12 percent of the water and agitated until homogeneous. The hexamethylene tetraamine solution is added to the main mix tank and agitated for 15 minutes. The treated diatomaceous earth, the wax, and the zinc oxide is prepared by adding about 13 to 18 percent of the water to a premix tank with agitation. After these ingredients are mixed, they are added to the main mix tank and agitated for 25 minutes. The formaldehyde is diluted with about 2 to 4 percent of the water and incorporated into the coating composition and added to the main mix tank at the rate of about 1.4 kilograms per minute. After all the formaldehyde has been added, and the total mixture has been agitated for about 25 minutes, the agitation is continued and the batch is allowed to age for at least 6 hours before use as a coating composition.

The sizing compositions which have been found to have particular utility in sizing glass fibers useful for coating with the composition of the invention are fully described in U.S. Pat. No. 3,655,353 entitled, "Glass Fiber Size" by Charles E. Nalley and Joe B. Lovelace, incorporated herein by reference and made a part hereof and U.S. Pat. No. 3,887,389 by Jerry C. Hedden entitled "Fiber Glass Sizing for Use in Tire Cord Manufacturing" also incorporated herein by reference.

Preferably in the practice of the invention, the cord should be constructed as G-75, 5/0 when the cord is to be used in bias belt tires and G-75,10/0 or G-75,15/0 when the cord is to be utilized in the carcass and the belts of radial tires. G fibers characteristically are $9.6 \times 10^{-6}$ meters to $9.1 \times 10^{-6}$ meters in diameter and have a filament count of 2,000 in a cord being constructed of five strands, each strand having 400 filaments. Also, K fibers have utility in cord for use in both bias belted and radial tires. A K-15 strand typically has 1,000 filaments therein, each filament having a diameter of about $13.34 \pm 0.63$ microns ($5.25 \pm 0.25 \times 10^{-4}$ in.), the use of 1 to 3 strands per cord is preferred. When G cord is to be used in bias belted tires, the cord should be constructed of five strands and when the cord is to be used in radial tires, there should be 10–15 strands per cord.

The 10–15 strand cord allows higher packing of the cord per unit area, thereby providing greater strength to the tire carcass. This strength is necessary to obtain desirable properties in radial ply tires. When the cord, 10–15 strands therein, is incorporated into a rubber matrix, it has been found to cure therein without any blow hole effect while maintaining adhesion, tensile aging, and heat resistance.

The following examples will further illustrate in detail the nature of this invention.

EXAMPLE I

The G fibers were sized with the following composition:

| Ingredient | Parts by Weight (Grams) |
|---|---|
| Propylene emulsion containing 25 percent by weight of polypropylene (molecular weight 6,300) and 6 percent by weight of emulsifying agent | 5,000 |
| Polyvinyl alcohol (Elvanol ® 52-22 sold by duPont) | 500 |
| Amide Imidizoline (Emery Industries 1200-136) | 200 |
| Methylacryloxy propyltrimethoxy silane | 250 |
| Acetic Acid | 10 |
| Silicone defoamer (Sag ® 470) | 3.8 |
| Water | Sufficient to make 10 gallons |

The above sizing composition was applied to the fibers during formation and the strand formed therefrom was dried and/or cured in accordance with the method described in U.S. Pat. No. 3,655,353 incorporated herein by reference.

A coating composition was prepared having the following ingredients:

| Ingredient | Parts by Weight (Grams) |
|---|---|
| Deionizer Water | 45 |
| NH4OH (28 percent in water) | 0.5 |
| Resorcinol | 4.0 |
| Penacolite R2200 - 70 percent in water | 15.7 |
| Gentac® 121 (styrene-butadiene-vinyl-pyridine latex 15:15:70; 41 percent solids in water) | 183 |
| Neoprene 735 (manufactured by duPont) 43 percent solids in water | 58 |
| Deionized water | 5 |
| Hexamethylene tetraamine | 0.75 |
| Deionized water | 10.0 |
| Mobilcer® Q (microcrystalline wax 50 percent solids in water) | 10 |
| Paracure® A09 (calcium treated diatomaceous earth 50 percent, 2,6-ditertiary butyl phenol 50 percent) | 1 |
| zinc oxide 50 percent in water | 2.0 |
| Deionized water | 5.0 |
| Formaldehyde (37 percent in water) | 4.5 |

The composition was formulated as follows:

To a premix tank was charged the 45 parts of deionized water at 24° C.±1° C. The ammonium hydroxide was added to the premix tank while agitating at 17.5 rpm. The resorcinol was added to the premix tank agitated at 48 rpm. The above mixture was agitated for 10 minutes. The Penacolite® 2200 was charged to the premix tank and agitation was continued for 15 minutes. After 15 minutes, the agitation was stopped and the material was allowed to stand for 45 minutes. To a main mix tank was charged the Gentac® 121 while agitating at 48 rpm. The Neoprene 735 A was then charged to the main mix tank. The Penacolite®, resorcinol, ammonia premix was charged to the main mix tank after checking this material to determine if its pH was 7.5 or above. If the pH was below 7.5, the mixture was adjusted by adding more ammonia thereto. After charging the Penacolite®, resorcinol premix to the main mix tank, the mixture was agitated for 25 minutes. Five parts of deionized water was mixed with 0.75 parts of hexamethylene tetraamine until the hexymethylene tetraamine was dissolved. The amine solution was charged to the main mix tank. A dispersion was made of 10 parts of deionized water, the Mobilcer® Q, the Paracure® A09 and the zinc oxide by agitating this mixture at 48 rpm for 15 minutes. After agitation was completed, this mixture was added to the main mix tank and agitated for 25 minutes. The formaldehyde was diluted with 5 parts of water and added at a rate of 10 percent of the total formaldehyde water solution per minute. After all the formaldehyde was added, the mixture was agitated for 25 minutes. The coating composition was allowed to age for 6 hours before using. The above coating composition had a solids of 26.0±0.5 and a pH of 8.5±0.4.

A glass fiber tire cord was prepared by coating 15 of the sized strands with the above coating composition as hereinbefore described producing a G-75,15/0 cord. This cord was incorporated into a rubber stock and also used to reinforce the belts of a radial tire. In bias belted tires, five of the sized strands were coated to form G-75,5/0 cord. The results of the testing are shown on Table 1. The cord as above produced had a 20 percent coating solids add on based on the weight of the bare glass.

EXAMPLE II

Example I was repeated except that the following coating composition was utilized.

| Ingredient | Parts by Weight (Grams) |
|---|---|
| Deionized Water | 47 |
| NH4OH (28 percent in water) | 0.5 |
| Resorcinol | 4.0 |
| Penacolite® R2200 | 16 |
| Gentac® 121 | 195 |
| Neoprene 735 | 46.5 |
| Deionized water | 10.0 |
| Mobilcer® Q | 10.0 |
| Paracure® A09 | 1.0 |
| Deionized water | 5.0 |
| Formaldehyde (37 percent in water) | 6.8 |

This composition was formulated as in Example I and an additional 132 parts of water were added to provide a coating composition of 26 percent by weight solids. The results of cord produced with the above coating composition is shown in Table 1.

EXAMPLE III

Example I was repeated except that the following coating composition was used in place of the coating composition of Example I.

| Ingredient | Parts by Weight (Grams) |
|---|---|
| Deionized water | 85 |
| NH4OH (28 percent in water) | 0.5 |
| Penacolite® R2200 | 15.7 |
| Gentac® 121 | 208 |
| Neoprene 735 | 39.5 |
| Deionized water | 10.0 |
| Mobilcer® Q | 10.0 |
| Paracure® A09 | 1.0 |
| Deionized water | 10.0 |
| Formaldehyde (37 percent in water) | 6.7 |

The results of cord coated with the above coating composition are shown on Table 1.

EXAMPLE IV (Control)

Example I was repeated except that the following coating composition was substituted for the coating composition of Example I.

| Ingredient | Parts by Weight (Grams) |
|---|---|
| Deionized water | 85 |
| Ammonium hydroxide (28 percent in water) | 0.5 |
| Penacolite® R2200 | 15.7 |
| Gentac® 121 | 75 |
| Genflow® (Styrene butadiene rubber) 41 percent solids in water | 25 |
| Deionized water | 10 |
| Microcrystaline wax | 10 |
| Paracure® A09 | 1 |
| Formaldehyde | 6.7 |
| Deionized water | 10 |

Glass fiber cord was prepared in accordance with Example I and the results of testing such cord is shown on Table 1.

EXAMPLE V

Glass fibers were sized and coated in accordance with Example I except the following coating composition was utilized.

| Ingredient | Parts by Weight (Grams) |
|---|---|
| Deionized water | 45 |
| NH₄OH | 0.5 |
| Resorcinol | 4.0 |
| Penacolite ® R2200 | 15.7 |
| Gentac ® 121 | 183 |
| Neoprene 735 | 58 |
| Natural Rubber (50 to 54 percent solids in water) | 10 |
| Deionized water | 5 |
| Hexamethylene tetraamine | 0.75 |
| Deionized water | 10 |
| Paracure ® A09 | 1 |
| Zinc oxide | 1.0 |
| Deionized water | 5.0 |
| Formaldehyde | 4.5 |

K15, 1/0 cord was produced from strand coated with the above composition. Bias belted tires were constructed from the above cord and tested on a 100 percent cobblestone track for endurance. The results of this test are reported on Table I.

EXAMPLE VI

Example V was repeated except that 21 grams of Mobilcer ® Q wax was added to the composition and 6 grams of natural rubber was used instead of 10 part of natural rubber.

The testing results of the cord of Example VI are reported on Table I.

EXAMPLE VII (Control)

Example IV was repeated and the cord formed therefrom was used to build bias belted tires which were tested in accordance with Examples V and VI and tested therewith. The test results are reported on Table I.

TABLE I

| Example | Breaking Strength (lbs.) | Breaking Strength (Newtons) | In Rubber Tensile (lbs.) | In Rubber Tensile (Newtons) | In Rubber Tensile Aged 100 Hrs. at 121° C. (lbs.) | In Rubber Tensile Aged 100 Hrs. at 121° C. (Newtons) | Strip Adhesion Tested at 121° C. (lbs.) | Strip Adhesion Tested at 121° C. (Newtons) | Strip Adhesion Aged 96 Hrs. at 121° C. (lbs.) | Strip Adhesion Aged 96 Hrs. at 121° C. (Newtons) | Strip Adhesion Exposed at 121° C. (lbs.) | Strip Adhesion Exposed at 121° C. (Newtons) | Blow Hole Rating | Cord Diameter | Cord Integrity | Dot High Speed (Miles/Hr.) | Dot High Speed (Kilometers/Hr.) | Tire Testing (Radial) Cleated Wheel Miles to Failure (Miles) | Tire Testing (Radial) Cleated Wheel Miles to Failure (Kilometers) | Endurance (Miles) | Endurance (Kilometers) | Tire Testing (Bias Belted) Endurance 6,400 Laps* (Breaks X-Ray Frame) |
|---|---|---|---|---|---|---|---|---|---|---|---|---|---|---|---|---|---|---|---|---|---|---|
| I | 167 | 743 | 180 | 801 | 230 | 1,023 | 37 | 164 | 28 | 124 | 40 | 178 | 4.0 | 0.042 | Good | 110 | 177 | 3,000 | 4,827 | 13,000 | 20,917 | 9 |
| II | 186 | 827 | 213 | 947 | 259 | 1,152 | 48 | 213 | 25 | 111 | 43 | 191 | 2.0 | 0.044 | Fair | 105 | 169 | 1,600 | 2,574 | 9,500 | 15,288 | 78 |
| III | 180 | 801 | 205 | 912 | 265 | 1,179 | 41 | 182 | 26 | 116 | 43 | 191 | 2.5 | 0.044 | Fair | 105 | 169 | 1,960 | 3,154 | — | — | 78 |
| IV (Control) | 174 | 774 | 188 | 838 | 237 | 1,054 | 40 | 177 | 15 | 67 | 38 | 169 | 1.0 | 0.045 | Poor | 105 | 168 | 1,200 | 1,931 | 7,250 | 11,584 | 136 |
| V | — | — | — | — | — | — | 44 | 196 | 42 | 187 | — | — | — | 0.022 | — | — | — | — | — | — | — | 0 |
| VI | — | — | — | — | — | — | 40 | 178 | 41 | 182 | — | — | — | .022 | — | — | — | — | — | — | — | 1.5 |
| VII | — | — | — | — | — | — | 41 | 182 | 19 | 84 | — | — | — | .024 | — | — | — | — | — | — | — | 18.2 |

*(100 percent Cobblestone Automotive Research Assn.)

The "Breaking Strength" is determined by placing a single cord in the jaws of an Instron ® test device with a gauge length of 25.4 cm. and a cross head speed of 30.5 cm. per minute. The jaws are separated and the force required to break the cord is recorded.

The "In Rubber Tensile" is determined by curing the cord in a rubber matrix and testing the glass fiber cord reinforced matrix in an Instron ® test device with a gauge length of 17.8-19 cm. and a cross head speed of 5.1 cm. per minute. The jaws are separated and the force required to break the sample is recorded. The "In Rubber Tensile Aged 100 Hours at 121° C." is determined the same as the rubber tensile except that the samples are conditioned for 100 hours at 121° C., cooled to room temperatures and tested.

Strip adhesion for rubber coated glass cord is determined by the following method. A cylindrical drum is wrapped by a 10.2×26.7 cm.×0.1 cm. strip of rubber stock. The rubber stock occupied substantially all of the surface area of the cylindrical drum. The coated glass fiber yarn is wrapped about the rubber stock on the drum in a cylindrical fashion, providing a continuous layer of yarn over the rubber stock. The wound rubber stock is removed from the cylinder and cut into a 7.6×25.4 cm. sample.

A strip of 7.6×25.4 cm. rubber is placed in a 7.6×25.4 cm. mold and the above rubber strip with the coated strand thereon is placed in the mold with the strand side away from the first rubber strip. Two 7.62×2.54 cm. strips of Holland cloth are placed at opposite ends of the strand side of the rubber strip. Another 7.62×25.4 cm. rubber strip is placed over the Holland cloth and lastly, a 7.62×25.4 cm. rubber strip of coated strand thereon is placed on the last mentioned rubber strip with the strand side in contact with the last mentioned rubber strip. The mold is closed and the rubber cord laminate is cured at 4,788 pascals for 30 minutes at 149° C. The rubber cord laminate is removed from the mold and is allowed to slowly cool overnight.

The laminate is cut into 14×2.54 cm. strips and heated for 30 minutes at 121° C., after which the Holland cloth is removed from the laminate. After setting an Instron ® test device for a gauge length of 1.27 to 1.9 cm. and calibrating the unit for a cross head speed of 5.1 cm. per minute, the bottom layer of the heated rubber and the exposed cord are placed in the top jaw and the top layer of the heated rubber in the bottom jaw of the test device. The Instron ® test device is operated until a separation of 5.1 cm. is obtained and the loading is noted. The top layer is inserted into the top jaw and the cord in the bottom jaw with a gauge length of 1.27 to 1.9 cm. The Instron ® device is operated until a separation of 5.1 is obtained and the loading is noted. The test is repeated for the opposite end of the specimen and for additional specimens included in the sample. The results of the tests are averaged for adhesion of the cords to rubber.

"Strip Adhesion Aged 96 Hours at 121° C." is conducted by the same method as the "Strip Adhesion at 121° C." except the test specimen is aged for 96 hours at 121° C. before testing.

"Strip Adhesion Exposed" is conducted by the same method as the "Strip Adhesion at 121° C.". However, before testing, the composite is exposed to ultraviolet light for a designated period of time.

The Blow Hole rating is a visual test having a scale of from 1-4, 4 being the maximum improvement over the control, which is rated at 1. The Blow Hole phenomenon can be observed by curing a composite of an elastomeric latex with the cord therein and cutting the sample in the direction perpendicular to the layer of the cord within the matrix and observing the orientation of the cord within the matrix. A sample which would be severely blow holed would be one which the individual strands in the cord would be separated from each other, having the portions in contact with the rubber matrix adhered thereto while the strands would not be adhered to each other. One showing maximum improvement would be where the strands had excellent cohesion to each other and also excellent adhesion to the rubber matrix and thus would not be separated in any way.

As can be seen from Table 1 and the preceding examples, a glass fiber coating composition having a combination of styrene-butadiene-vinylpyridine latex at a level of 50-90 percent by weight and a Neoprene latex at a level of 10-50 percent by weight, imparts reduction in Blow Hole phenomenon. This Blow Hole phenomenon is a particular problem when radial tires are to be reinforced with glass fibers since thicker cord, i.e., cords having 10-15 strands therein are utilized. The invention obviates this Blow Hole phenomenon problem while maintaining other physical properties which are necessary for adequate reinforcement of the resin matrix.

While the invention has been described with respect to details of a preferred coating composition, other formulations of the coating composition and other ingredients may be added to the coating composition. It is such to be understood that the invention is not necessarily limited to the precise formulations and methods described herein except insofar as is set forth in the accompanying claims.

I claim:

1. A glass fiber aqueous coating composition, said glass fibers being useful for reinforcing elastomers, comprising in part by weight on a dry solids basis, and also the latex on the basis of 100 parts of total elastomer:
   10-30 neoprene latex
   70-90 styrene-butadiene-vinylpyridine latex
   4-20 resorcinol formaldehyde resin
   2-6 resorcinol
   1-3 formaldehyde
   up to 1.5 hexamethylene tetraamine.

2. The coating composition of claim 1 being 20 to 40 percent solids by weight in water.

3. The coating composition of claim 1 having therein 0.1 to 1 part by weight of a member selected from the group consisting of calcium treated diatomaceous earth and magnesium treated diatomaceous earth.

4. The coating composition of claim 1 having therein up to 3 parts by weight of a member selected from the group consisting of zinc oxide, litharge, magnesium oxide and red lead.

5. The coating composition of claim 1 having therein up to 25 parts by weight of wax.

6. The coating composition of claim 1 having therein up to 25 parts by weight of natural rubber.

7. A glass fiber aqueous coating composition, said glass fibers being useful for reinforcing elastomers comprising, in parts by weight on a dry solids basis:
   25 neoprene latex
   75 styrene-butadiene-vinylpyridine latex
   11 resorcinol formaldehyde resin
   4 resorcinol
   1.7 formaldehyde
   5 wax
   1.2 zinc oxide
   0.75 hexamethylene tetraamine.

8. The coating composition of claim 7 being 20 to 40 percent by weight solids in water.

* * * * *